United States Patent
Kladias et al.

(10) Patent No.: US 8,776,550 B2
(45) Date of Patent: Jul. 15, 2014

(54) METHOD AND SYSTEM FOR MAKING GLASS ARTICLES

(71) Applicant: Corning Incorporated, Corning, NY (US)

(72) Inventors: Nikolaos P Kladias, Horseheads, NY (US); Kenneth Spencer Morgan, Painted Post, NY (US); Elias Panides, Whitestone, NY (US); Rohit Rai, Painted Post, NY (US); John R Ridge, Hammondsport, NY (US); Ljerka Ukrainczyk, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 82 days.

(21) Appl. No.: 13/657,175

(22) Filed: Oct. 22, 2012

(65) Prior Publication Data
US 2013/0125588 A1     May 23, 2013

Related U.S. Application Data

(60) Provisional application No. 61/563,197, filed on Nov. 23, 2011.

(51) Int. Cl.
| C03B 23/02 | (2006.01) |
| C03B 23/023 | (2006.01) |
| C03B 35/14 | (2006.01) |
| C03B 29/08 | (2006.01) |
| C03B 23/025 | (2006.01) |
| C03B 25/08 | (2006.01) |
| C03B 23/035 | (2006.01) |

(52) U.S. Cl.
CPC ............ *C03B 23/0258* (2013.01); *C03B 29/08* (2013.01); *C03B 35/14* (2013.01); *C03B 25/08* (2013.01); *C03B 23/0357* (2013.01)
USPC .................................. 65/103; 65/106; 65/286

(58) Field of Classification Search
CPC .............................. C03B 29/08; C03B 29/033
See application file for complete search history.

(56) References Cited

U.S. PATENT DOCUMENTS

| 4,483,700 | A | 11/1984 | Forker, Jr. et al. |
| 5,674,790 | A | 10/1997 | Araujo |
| 7,666,511 | B2 | 2/2010 | Ellison et al. |
| 2007/0283720 | A1 | 12/2007 | Guillaume |

FOREIGN PATENT DOCUMENTS

| EP | 0233778 | 8/1987 |
| EP | 0592862 | 4/1994 |
| EP | 0838438 | 4/1998 |

*Primary Examiner* — Matthew Daniels
*Assistant Examiner* — Lisa Herring
(74) *Attorney, Agent, or Firm* — John T. Haran

(57) ABSTRACT

A glass sheet is placed on a mold and heated to a first temperature. The glass sheet is then formed into a glass article having a three-dimensional shape using the mold. An isothermal heat transfer device comprising at least one heat pipe is provided in thermal contact with the mold. With the glass article on the mold and the isothermal heat transfer device in thermal contact with the mold, the glass article, mold, and isothermal heat transfer device are transported along a thermally-graded channel to cool the glass article to a second temperature. During the transporting, the isothermal heat transfer device transfers heat from a relatively hot region of the mold to a relatively cold region of the mold.

11 Claims, 5 Drawing Sheets

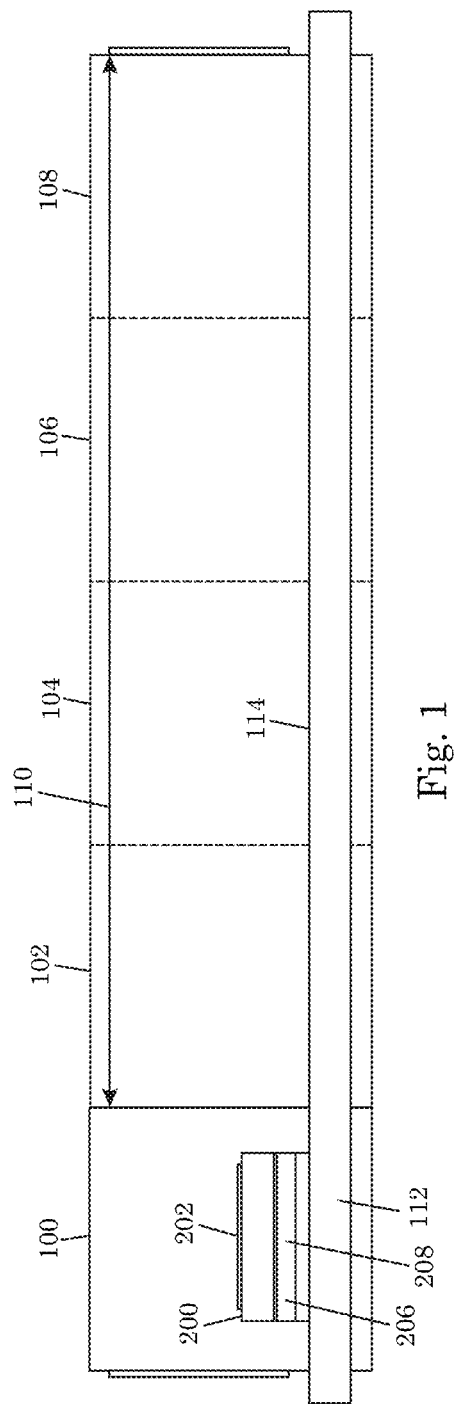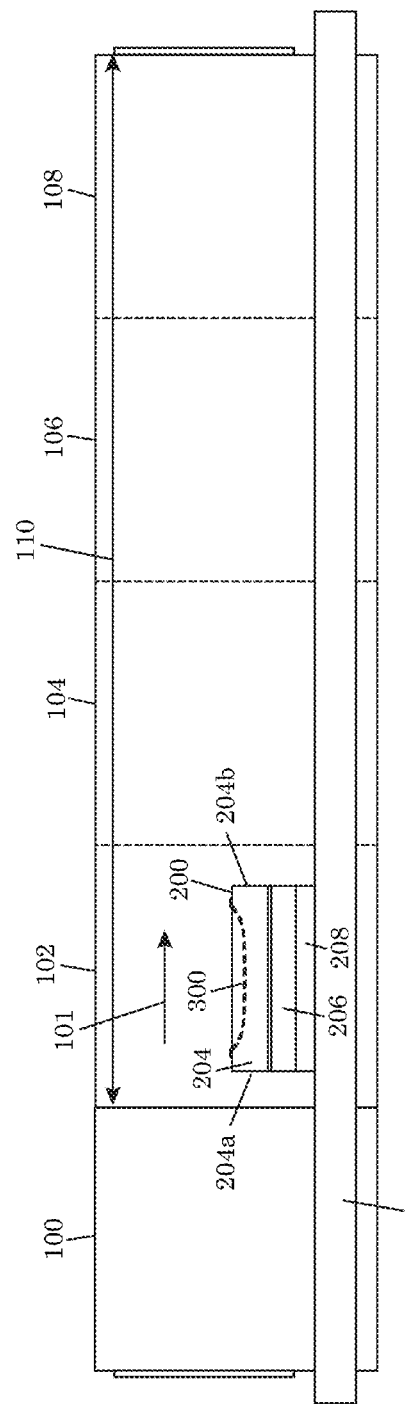

METHOD AND SYSTEM FOR MAKING GLASS ARTICLES

CROSS-REFERENCE TO RELATED APPLICATIONS

This application claims the benefit of priority under 35 U.S.C. §119 of U.S. Provisional Application Ser. No. 61/563,197 filed on Nov. 23, 2011 the content of which is relied upon and incorporated herein by reference in its entirety.

FIELD

The present disclosure relates to production of glass articles and control of mold temperature during cooling of a glass article on the mold.

BACKGROUND

Glass articles, such as cover glasses, for handheld electronic devices may be made by thermal reforming. The process involves heating a glass sheet to a temperature at which the glass can be deformed without damage. The heated glass is then formed into a glass article having a three-dimensional ("3D") shape.

SUMMARY

To meet design specifications, glass articles for handheld devices have to meet very tight shape accuracy on the order of ±50 µm. To achieve such shape accuracy, the glass article, after forming, is cooled and/or annealed while on the mold until the glass reaches a temperature below the glass transition temperature at which the glass article can be safely removed from the mold. The cooling phase typically involves transporting the mold, with the glass article thereon, along a succession of cooling stations. To prevent warping of the glass article and to achieve the required shape accuracy, the temperature differentials across the surface of the glass article should be very small, e.g., not greater than 5° C., and the temperature differentials across the thickness of the glass article should be very small, e.g., not greater than 2° C., during the cooling phase.

Temperature decreases progressively along the succession of cooling stations, which means that any downstream cooling station will have a lower temperature than the adjacent upstream cooling station. If there are no physical barriers between the cooling stations, the leading end of the mold would be exposed to a lower temperature environment while the trailing end of the mold would be exposed to a higher temperature environment. This would induce a temperature differential between the leading and trailing ends of the mold. The induced temperature differential will influence the surface and thickness temperature differentials of the glass article on the mold, possibly resulting in unacceptable surface and thickness temperature differentials.

In one aspect, the present disclosure describes a method of producing glass articles. The method includes placing a glass sheet on a mold, heating the glass sheet to a first temperature, and forming the glass sheet into a glass article having a three-dimensional profile using the mold. The method further includes providing an isothermal heat transfer device comprising at least one heat pipe in thermal contact with the mold. With the glass article on the mold and the isothermal heat transfer device in thermal contact with the mold, the glass article, mold, and isothermal heat transfer device are transported along a thermally-graded channel to cool the glass article to a second temperature. During the transporting, the isothermal heat transfer device transfers heat from a relatively hot region of the mold to a relatively cold region of the mold, thereby minimizing or eliminating temperature differential between the leading and trailing ends of the mold.

In one embodiment, heat is transferred from a trailing end of the mold to a leading end of the mold during the transporting.

In one embodiment, the thermally-graded channel has a negative thermal gradient in a direction in which the glass article, mold, and isothermal heat transfer device are transported.

In one embodiment, the transfer of heat by the isothermal heat transfer device is such that a maximum temperature differential across a surface of the glass article does not exceed 5° C.

In one embodiment, the transfer of heat by the isothermal heat transfer device is such that a maximum temperature differential across a thickness of the glass article is less than 3° C.

In one embodiment, the transfer of heat by the isothermal heat transfer device is such that after the glass article is separated from the mold, an absolute maximum deviation of a shape of the glass article from an ideal shape is not greater than 0.050 mm.

In one embodiment, the method further includes absorbing excess heat from the isothermal heat transfer device using a heat sink.

In one embodiment, the method further includes controlling an air temperature in the thermally-graded channel to a temperature of the isothermal heat transfer device during the transporting.

In one embodiment, the first temperature to which the glass sheet is heated is between a temperature corresponding to a glass viscosity of $10^{9.1}$ poise and a temperature corresponding to a glass viscosity of $10^7$ poise.

In one embodiment, the second temperature to which the glass article is cooled is below a temperature corresponding to a glass viscosity of $10^{12}$ poise.

In one embodiment, the method further includes preheating the glass sheet to an initial temperature prior to the heating the glass sheet to the first temperature.

In another aspect, the present disclosure describes a system of producing glass articles. The system includes a mold having a molding surface with a three-dimensional shape and an isothermal heat transfer device comprising at least one heat pipe. The isothermal heat transfer device is arranged in thermal contact with the mold and is configured to transfer heat from a relatively hot region of the mold to a relatively cold region of the mold.

In one embodiment, the system further includes a series of temperature-controlled chambers forming a thermally-graded channel.

In one embodiment, the system further includes a conveyor device for transporting the mold and isothermal heat transfer device along the thermally graded channel.

In one embodiment, the at least one heat pipe of the isothermal heat transfer device contains sodium or potassium as a condensable working fluid.

In one embodiment, the at least one heat pipe of the isothermal heat transfer device is operable in a temperature range of 550° C. to 900° C.

In one embodiment, the isothermal heat transfer device is soldered or clamped to a bottom of the mold.

In one embodiment, the isothermal heat transfer device is embedded in a bottom of the mold.

In one embodiment, the system further includes a heat sink for absorbing excess heat from the isothermal heat transfer device.

In one embodiment, the heat sink is a cooling plate.

It is to be understood that both the foregoing general description and the following detailed description are exemplary of the invention and are intended to provide an overview or framework for understanding the nature and character of the invention as it is claimed. The accompanying drawings are included to provide a further understanding of the invention and are incorporated in and constitute a part of this specification. The drawings illustrate various embodiments of the invention and together with the description serve to explain the principles and operation of the invention.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

FIG. 1 shows a series of temperature-controlled chambers.

FIG. 4 shows a glass article on a glass molding assembly in a cooling chamber.

DETAILED DESCRIPTION

Figure 2:
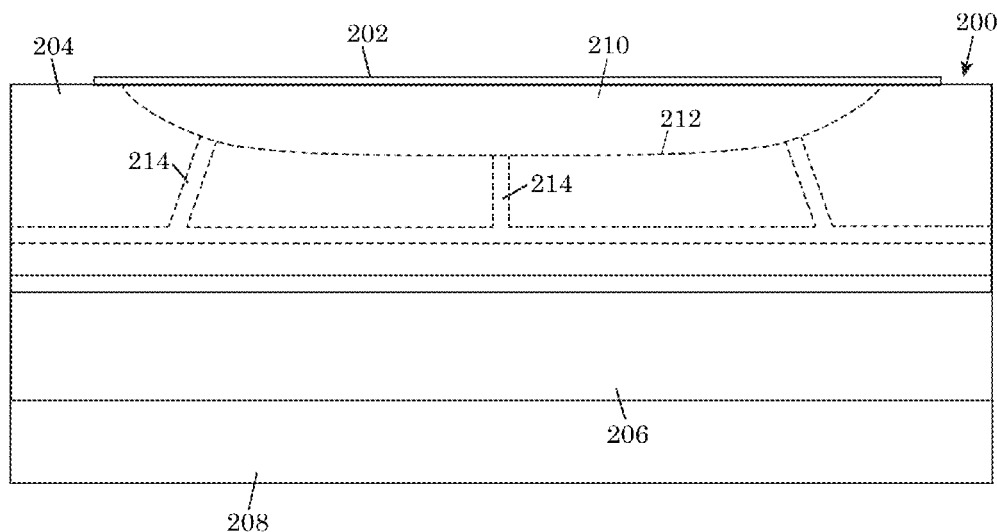
FIG. 2 shows a glass sheet on a glass molding assembly.

In the following detailed description, numerous specific details may be set forth in order to provide a thorough understanding of the various embodiments of the invention. However, it will be clear to one skilled in the art when embodiments of the invention may be practiced without some or all of these specific details. In other instances, well-known features or processes may not be described in detail so as not to unnecessarily obscure the invention. In addition, like or identical reference numerals may be used to identify common or similar elements.

FIG. 1 shows a sequence of temperature-controlled chambers 100, 102, 104, 106, 108 in which a process of making a glass article having a 3D shape can be carried out. The chambers may also be described as zones or stations. The number of chambers may be more or less than what is shown in FIG. 1. The first temperature-controlled chamber 100 is a forming chamber where a glass sheet will be formed into a glass article having a 3D shape. The forming chamber 100 is a heating chamber capable of delivering heat to the glass sheet in order to allow the glass sheet to reach a state at which it could be formed into the glass article without damage. The forming chamber 100 may incorporate suitable heating elements, such as mid-infrared heaters, induction heaters, or resistive heaters, for heating the glass sheet to a desired temperature.

The remaining temperature-controlled chambers 102, 104, 106, 108 are cooling chambers where the glass article will be cooled to a temperature where the glass article can be safely separated from the mold. The cooling chambers 102, 104, 106, 108 are each at a different temperature and thereby define a thermally-graded channel 110. The cooling chambers 102, 104, 106, 108 may incorporate heating elements and insulation to provide and maintain a desired cooling chamber temperature. There may or may not be partitions between the cooling chambers 102, 104, 106, 108. If there are partitions, the partitions would be removable or would include doors to allow a glass/mold assembly to be transported through the chambers.

FIG. 2 shows a glass molding assembly 200 for reforming a glass sheet 202 into a glass article having a 3D shape. The glass molding assembly 200 includes a mold 204, an isothermal heat transfer device 206 in thermal contact with the mold 204, and a heat sink 208 adjacent to the isothermal heat transfer device 206. The heat sink 208 may be in contact with the isothermal heat transfer device 206. The glass sheet 202 is placed on top of the mold 204 so that a molding cavity 210 is defined between the glass sheet 202 and a molding surface 212 of the mold 204. The molding surface 212 has a 3D shape. The 3D shape of the molding surface 212 would be dictated by the desired 3D shape of the glass article to be made. The mold 204 may include holes or slots 214 for creating vacuum in the molding cavity 210 during forming of the glass sheet 202 into a glass article having a 3D shape.

In FIG. 1, the glass molding assembly 200 is placed in the forming chamber 100. Eventually, the glass molding assembly 200 will move sequentially through the cooling chambers 102, 104, 106, 108. A conveyor device 112 is provided to transport the glass molding assembly 200 through the chambers 100 through 108. The conveyor device 112 has a surface 114 that moves through the chambers 100 through 108. The conveyor device 112 may be, for example, a conveyor belt system or an indexing table system. The conveyor device 112 may be a linear or rotary mechanism, which means that the chambers 100 through 108 are not restricted to the linear arrangement shown in FIG. 1.

The isothermal heat transfer device 206 and heat sink 208 are not strictly needed in the forming chamber 100, but they are desired in the cooling chambers 102, 104, 106, 108, for reasons that will be described in more detail below. During the cooling phase of the glass article production process, the air temperature in each of the cooling chambers 102, 104, 106, 108 will be controlled to the temperature of the isothermal heat transfer device 206.

The mold 204 is made of a material that can withstand high temperatures, such as would be encountered while forming the glass sheet 202. The mold material may be one that will not react with (or not stick to) the glass under the forming conditions, or the molding surface 212 may be coated with a coating material that will not react with (or not stick to) the glass under the forming conditions. In one example, the mold 204 is made of a non-reactive carbon material, such as graphite, and the molding surface 212 is highly polished to avoid introducing defects into the glass when the molding surface 212 is in contact with the glass. In another example, the mold 204 is made of a dense ceramic material, such as silicon carbide, tungsten carbide, and silicon nitride, and the molding surface 212 is coated with a non-reactive carbon material, such as graphite. In another example, the mold 204 is made of a superalloy, such as INCONEL 718, a nickel-chromium alloy, and the molding surface 212 is coated with a hard ceramic material, such as titanium aluminum nitride. The atmosphere in the forming chamber 100 (in FIG. 1) should be inert if the mold 204 is made of a carbon material or if the molding surface 212 is coated with a carbon material.

The composition of the glass sheet 202 is selected based on the desired properties of the final glass article. For applications requiring high strength and scratch resistance, the glass sheet 202 may be made of an ion-exchangeable glass, i.e., a glass containing relatively small alkali metal or alkaline-earth metal ions that can be exchanged for relatively large alkali or alkaline-earth metal ions. Examples of ion-exchangeable glasses can be found in the patent literature, e.g., U.S. Pat. No. 7,666,511 (Ellison et al; 20 Nov. 2008), U.S. Pat. No. 4,483,700 (Forker, Jr. et al.; 20 Nov. 1984), and U.S. Pat. No. 5,674,790 (Araujo; 7 Oct. 1997), and are also available from Corning Incorporated under the trade name GORILLA® glass. Typically, these ion-exchangeable glasses are alkali-aluminosilicate glasses or alkali-aluminoborosilicate glasses. The ion-exchangeable glass will allow chemical strengthening of the glass article by ion-exchange, which would also make the glass article scratch resistant.

To reform the glass sheet 202 into a glass article having a 3D shape, the glass molding assembly 200 is placed in the forming chamber 100, as shown in FIG. 1. Then, the glass sheet 202, which would typically be a flat ("2D") sheet, is heated to a "forming temperature" at which the glass can be deformed without damage. In one embodiment, the forming temperature is between a temperature corresponding to a glass viscosity of $10^{13}$ poise and a temperature corresponding to a glass viscosity of $10^7$ poise. In a preferred embodiment, the forming temperature is between a temperature corresponding to a glass viscosity of $10^{11}$ poise and a temperature corresponding to glass viscosity of $10^7$ poise. In a more preferred embodiment, the forming temperature is between a temperature corresponding to a glass viscosity of $10^{9.1}$ poise and a temperature corresponding to a glass viscosity of $10^7$ poise. In yet another embodiment, the forming temperature is between a temperature corresponding to a glass viscosity of $10^{8.9}$ poise and a temperature corresponding to a glass viscosity of $10^8$ poise. The heating of the glass sheet 202 to the forming temperature may be preceded by a preheating phase outside of the forming chamber 100, for example, in order to minimize the residence time of the glass molding assembly 200 and glass in the forming chamber 100. The initial temperature of the glass due to the preheating will be less than the forming temperature.

Figure 3:
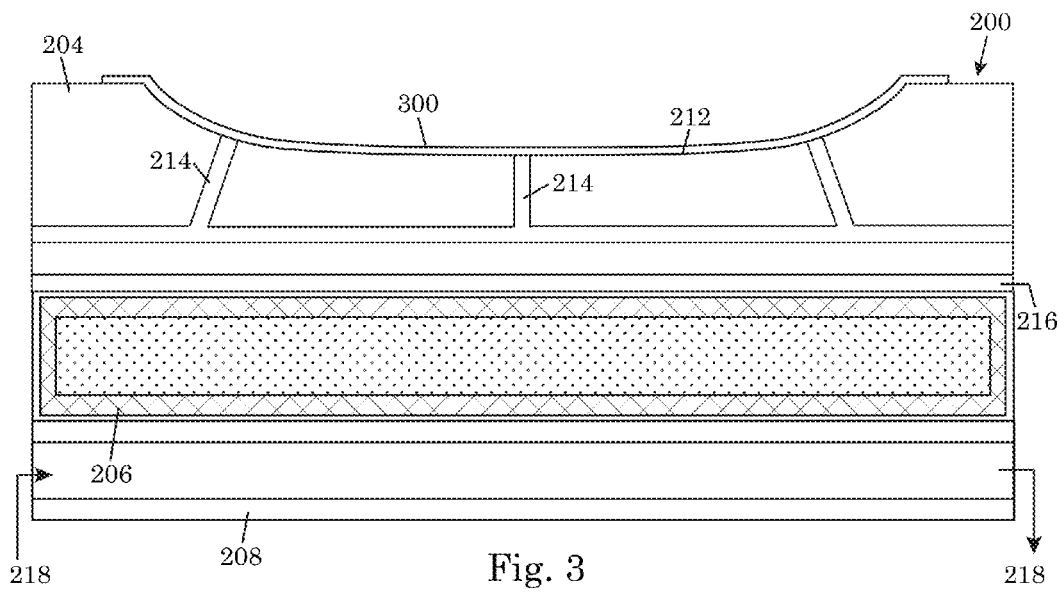
FIG. 3 shows a glass article on a glass molding assembly.

FIG. 3 shows a glass article 300 formed from the glass sheet 202. The glass article 300 contacts and conforms to the molding surface 212. The glass article 300 may be formed from the glass sheet 202 (in FIG. 2) by allowing the glass sheet 202 to sag or slump into the molding cavity 210 (in FIG. 2) by gravity. In some embodiments, vacuum is used to pull the glass sheet 202 against the molding surface 212. This involves creating vacuum in the molding cavity 210, e.g., by evacuating the molding cavity 210 through the holes or slots 214 using a vacuum pump. The act of creating a vacuum in the molding cavity 210 pulls the glass sheet 202 against the molding surface 212. Vacuum may be created in the molding cavity 210 before or after the glass sheet 202 has started sagging or slumping by gravity.

The glass article 300 is cooled or allowed to cool down in the cooling chambers 102, 104, 106, 108. At the end of the last cooling station 108, the glass article 300 will have a freezing temperature, which is a temperature at which the glass article 300 can be separated from the mold 204. In one embodiment, the freezing temperature is below a temperature corresponding to a glass viscosity of $10^{12}$ poise. In another embodiment, the freezing temperature is below a temperature corresponding to a glass viscosity of $10^{13}$ poise.

FIG. 4 shows the glass molding assembly 200 in the first cooling chamber 102, with the glass article on the mold 204.

After a selected time, e.g., 60 seconds, the glass molding assembly 200 and glass article 300 will be moved into the next cooling chamber, i.e., the second cooling chamber 104. This process of moving the glass molding assembly 200 and glass article 300 to the next chamber will continue until finally the glass molding assembly 200 and glass article 300 emerge at the end of the last cooling chamber 108. At this point, it would be possible to separate the glass article 300 from the mold 204 for additional finishing and strengthening processes. Additional finishing processes may include trimming the edge of the glass article 300 to achieve the glass article in the desired final size and applying various coatings, such as anti-smudge coating, on a surface of the glass article. Strengthening may be by chemical tempering, e.g., ion-exchange, or thermal tempering. The glass article 300 may also be annealed for stress relief. However, as will be shown later, the mold temperature uniformity achieved with use of the isothermal heat transfer device 206 makes it possible to bypass post-annealing of the glass article.

The thermally-graded channel 110 has a negative thermal gradient in the direction in which the glass article 300 and glass mold assembly 200 are traveling through the cooling chambers, as indicated by arrow 101 in FIG. 4. That is, temperature decreases along the length of the channel 110, from the first cooling chamber 102 to the last cooling chamber 108. For the illustrated system, $T_1 > T_2 > T_3 > T_4$, where $T_1$, $T_2$, $T_3$, $T_4$ are the temperatures or temperature ranges of the cooling chambers 102, 104, 106, 108, respectively. The term "temperature range" is used because it is quite possible that the temperature in each cooling chamber is not a constant value or that the temperature changes within a prescribed range with respect to time. Because of the negative thermal gradient of the thermally-graded channel 110, it is possible that at a given time, the trailing end 204a of the mold 204 may be exposed to a higher temperature than the leading end 204b of the mold 204 would be. It is desirable to control the difference in temperatures between the trailing and leading ends of the mold 204, since any non-uniformity in mold temperature would have an effect on surface and thickness temperature differentials of the glass article 300.

While the glass molding assembly 200 and glass article 300 are being transported through the thermally-graded channel 110, the isothermal heat transfer device 206 is in thermal contact with the mold 204. The isothermal heat transfer device 206 moves heat from a relatively hot region of the mold to a relatively cold region of the mold 204 so as to "flatten" (i.e., make uniform) the temperature of the mold 204 while the mold 204 is in the thermally-graded channel 110. Typically, the relatively hot region of the mold 204 would be at the trailing end of the mold 204, and the relatively cold region of the mold 204 would be at the leading end of the mold 204. The heat sink 208 absorbs excess heat from the isothermal heat transfer device 206. In one or more embodiments, with use of the isothermal heat transfer device 206 in thermal contact with the mold 204, the maximum temperature differential between any two points across a surface of the glass article 300 while the glass article 300 and mold 204 are transported through the thermally-graded channel 110 is not greater than 5° C. This surface could be the bottom surface of the glass article 300 in contact with the mold 204 or the exposed top surface of the glass article 300. In one or more embodiments, the maximum temperature differential along the thickness of the glass article is less than 3° C. Also, in one or more embodiments, after the glass article 300 is separated from the mold 204, the maximum absolute deviation of the shape of the glass article 300 from an ideal shape is not greater than 0.050 mm.

Figure 5A:
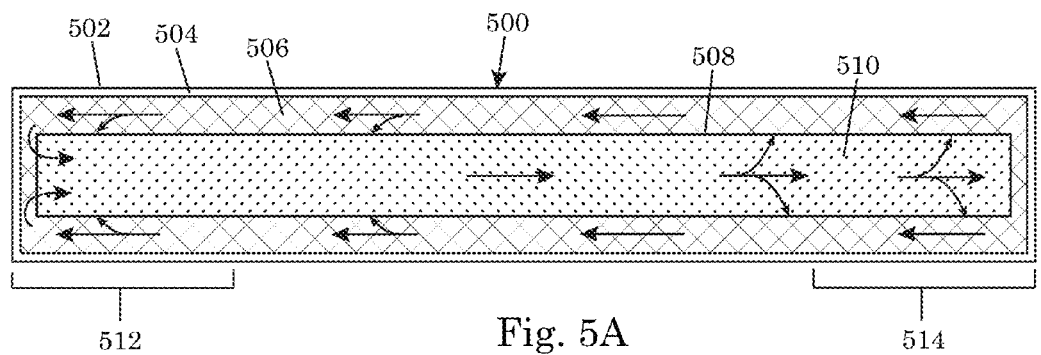
FIG. 5A shows a diagram of a heat pipe.

In one embodiment, the isothermal heat transfer device 206 is a two-phase heat transfer device including one or more heat pipes. A heat pipe is a device that uses evaporation and condensation to transfer heat. FIG. 5A shows a basic diagram of a heat pipe system 500. A heat pipe 502 includes a hermetically-sealed evacuated tube 504. The tube 504 can have a generally circular cross-section (for a tubular heat pipe) or can have a generally rectangular cross-section (for a flat heat pipe). The tube 504 is lined with a wick 506 and has a core 508 filled with a condensable working fluid 510. When one end, e.g., end 512, of the tube 504 is exposed to a temperature above the saturation temperature of the working fluid 510, the working fluid 510 at that end turns into vapor, absorbing the latent heat of evaporation. The hot vapor flows to the colder end, e.g., end 514, of the tube 504, where it condenses and gives out the latent heat. The condensed liquid then flows back through the capillary action of the wick 506 to the hot end 512 of the tube 504. Because the latent heat of evaporation is very large, considerable quantities of heat can be transported with a very small temperature difference from one end of the tube 504 to the other. The vapor pressure drop between the evaporator (at end 512) and the condenser (at end 514) is very small so that the evaporating-condensing cycle is essentially an isothermal process.

The working fluid 510 is selected based on the operating temperatures in the thermally-graded channel 110 (in FIG. 1). Examples of heat pipe working fluids are liquid nitrogen (−200° C. to −80° C.), liquid ammonia (−70° C. to +60° C.), methanol (−45° C. to +120° C.), water (+5° C. to +230° C.), mercury (+190° C. to +550° C.), potassium (+400° C. to +800° C.), sodium (+500° C. to +900° C.), lithium (+900° C. to +1,500° C.), and silver (+1,500° C. to +2,000° C.)—the numbers indicated in parentheses are the operating temperature ranges of the heat pipe working fluids. In one embodiment, the operating temperatures in the thermally-graded channel 110 may range from 550° C. to 900° C. In this case, sodium or potassium would be a suitable working fluid.

The wick 506 is a porous structure that is capable of returning the condensed liquid back to the hot end of the pipe by capillary action. The wick 506 may be in the form of a sintered metal powder, a grooved tube, or a metal mesh. In one example, the wick material is a metal such as steel, aluminum, nickel, copper, or titanium. In another example, the wick material includes fibers such as ceramic or carbon fibers.

The tube 504 is made of a material with high thermal conductivity such as nickel, copper, aluminum, or stainless steel. The material will generally be selected based on the temperatures that would be encountered in the temperature-controlled chambers 100 through 108 (in FIG. 1). That is, the material should be able to withstand the temperatures in the temperature-controlled chambers 100-108 (in FIG. 1). The material should also be compatible with the environment in the temperature-controlled chambers 100 through 108 and the working fluid 510. The tube 504 should be non-porous to prevent diffusion of the vapor.

The isothermal heat transfer device 206 (in FIGS. 2 and 3) can include a single heat pipe or an array of heat pipes. The heat pipe(s) of the isothermal heat transfer device 206 would be arranged relative to the mold 204 (in FIGS. 2 and 3) so that they move heat in a direction from the relatively hot region of the mold 204 (e.g., the trailing end of the mold) to the relatively cold region of the mold (e.g., the leading end of the mold). The terms "trailing" and "leading" are relative to the direction of travel of the mold through the thermally-graded channel 110 (in FIG. 1). In FIG. 4, the direction of travel is indicated at 101, with the trailing end of the mold at 204a and the leading end of the mold at 204b.

Figure 5B:
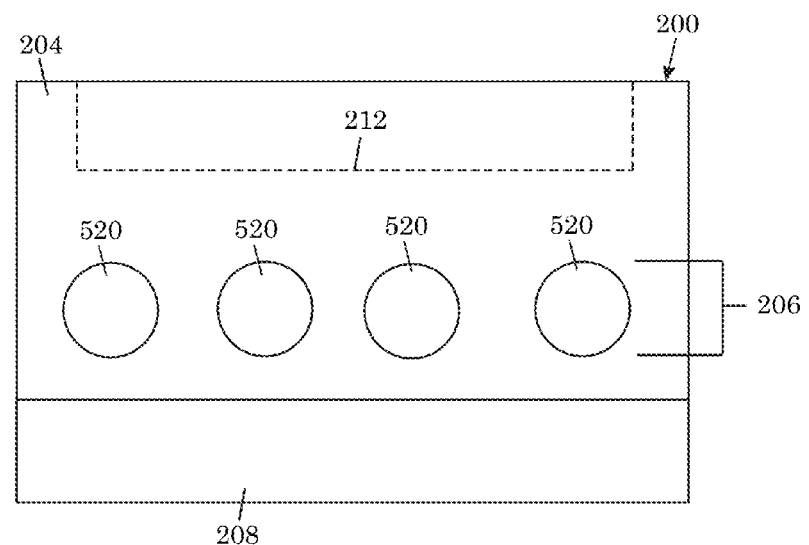
FIG. 5B shows a mold with an embedded isothermal heat transfer device.

To achieve thermal contact, the isothermal heat transfer device (heat pipe(s)) 206 can be attached to the mold 204 by means such as soldering. FIG. 3 shows the isothermal heat transfer device 206 attached to the mold 204 by solder 216. In another embodiment, the isothermal heat transfer device 206 could be clamped to the bottom of the mold 204 after the mating surfaces of the isothermal heat transfer device 206 and mold 204 have been ground flat to achieve acceptable thermal contact between the isothermal heat transfer device 206 and mold 204. In yet another embodiment, the isothermal heat transfer device (heat pipe(s)) 206 could be embedded in the bottom of the mold 204. FIG. 5B shows the isothermal heat transfer device 206 embedded in the bottom of the mold 204. Embedding can include forming one or more sealed cavities 520 in the bottom of the mold 204, where each of the sealed cavity is lined with a wick (as shown at 506 in FIG. 5A), evacuated of air, and filled with a heat pipe working fluid (as shown at 510 in FIG. 5A). The body of the mold 204 would function as the tube of the heat pipes. The view shown in FIG. 5B is an end view of the molding assembly 200. This end view could represent the trailing end or leading end of the molding assembly 200.

In addition to moving heat across the mold 204 so that the temperature of the mold 204 is flattened or made uniform, the isothermal heat transfer device 206 can also move heat from the mold 204 to the heat sink 208 to cool the mold 204. The heat sink 208 may have any suitable structure. In one embodiment, the heat sink 208 may be a cooling plate through which a coolant 218 (in FIG. 3) is circulated. The heat sink 208 will absorb excess heat from the isothermal heat transfer device 206 during the cooling phase.

Example 1

Figure 6:
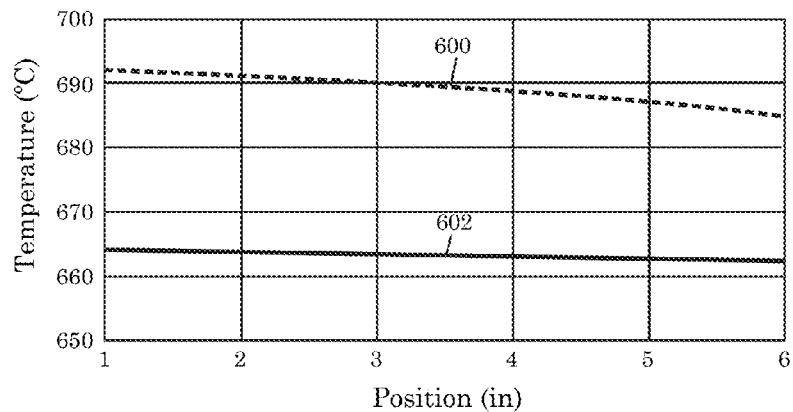
FIG. 6 shows a plot of mold temperature versus position.

A thermal model of the temperature-controlled chambers 100 through 108 (in FIG. 1) was developed using FLUENT® software by Ansys, Inc. For the thermal model, the temperatures of the chambers 100 through 108 were set at 800° C., 700° C., 660° C., 620° C., and 550° C., respectively. The thermal model was used to investigate the effect of cooling a mold using an isothermal heat transfer device on the temperature distribution of the mold. For the modeling, the mold and glass on the mold were indexed through the four cooling chambers with an index time of 60 seconds per chamber. FIG. 6 shows mold temperature as measured along a length of the mold. The positions shown are distances from the trailing end of the mold. The trailing end of the glass on the mold is at the 1-inch position, and the leading end of the glass on the mold is at the 6-inch position. The results shown in FIG. 6 are for the second cooling chamber that is controlled to 660° C. The curve 600 represents the mold temperature when the mold is cooled without the isothermal heat transfer device. The curve 602 represents the mold temperature when the mold is cooled with the isothermal heat transfer device. The plot of FIG. 6 shows that the temperature of the mold is much more uniform when the mold is cooled with the isothermal heat transfer device than without the isothermal heat transfer device. The same trend occurs in the other cooling chambers.

Example 2

Figure 7:
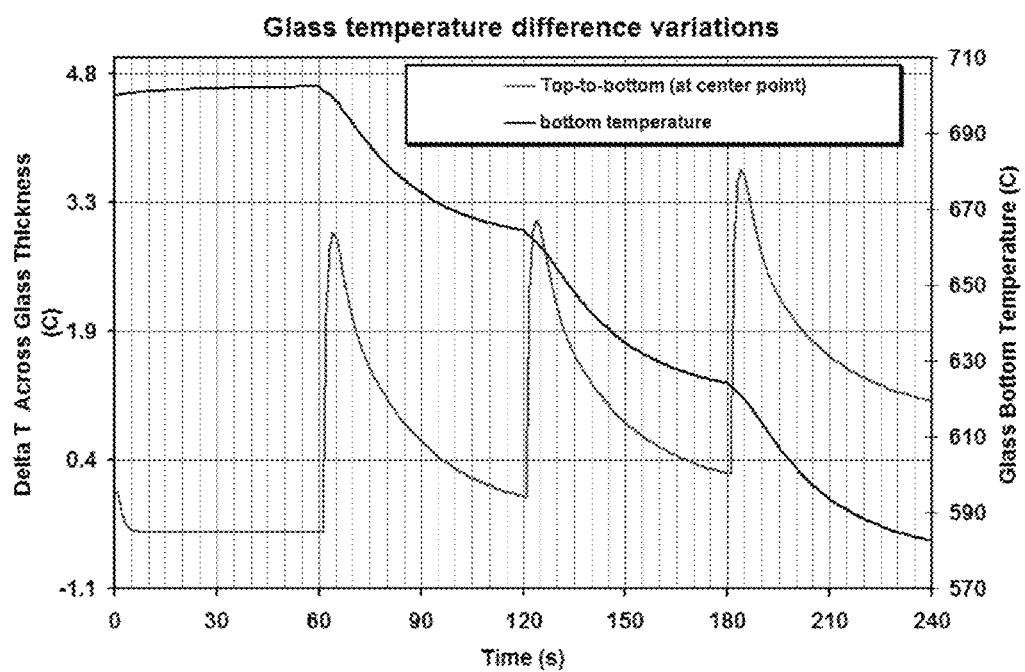
FIG. 7 shows a thermal profile input for a viscoelastic warp model.
Figure 8A:
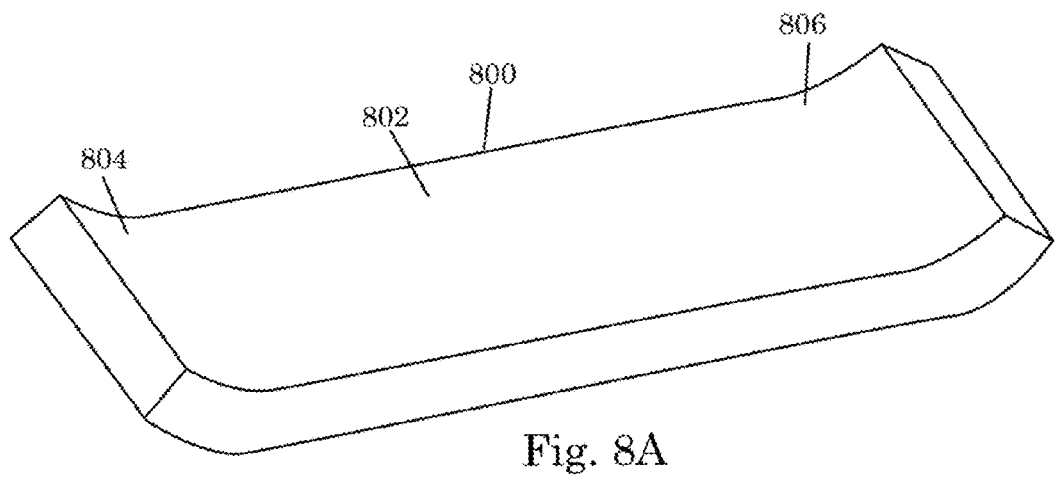
FIG. 8A shows a sled shape used in viscoelastic warp modeling.
Figure 8B:
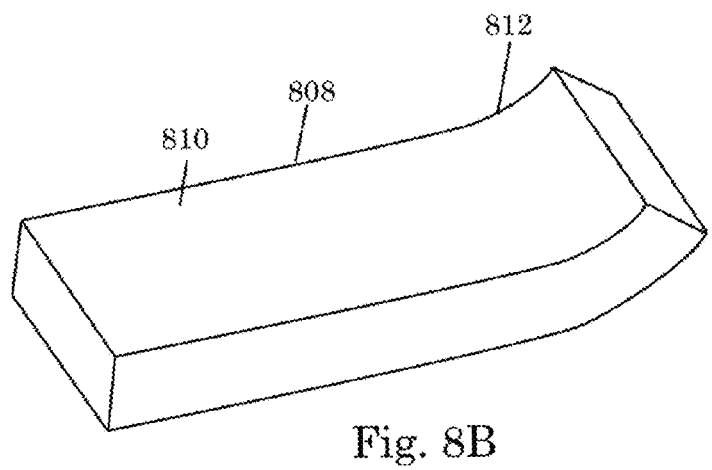
FIG. 8B shows a slide shape used in viscoelastic warp modeling.

Glass warp when the mold is cooled using the isothermal heat transfer device was investigated. FIG. 7 shows a thermal profile used as input for a viscoelastic warp model. The thermal profile includes a cooling schedule and thermal gradient along the thickness of the glass. The thermal gradient is from modeling of a mold with a glass article cooled with an isothermal heat transfer device. FIGS. 8A and 8B show the two shapes used in the viscoelastic warp model. In FIG. 8A, the sled shape 800 has a large flat area 802 and two bends 804, 806 at the edges. In FIG. 8B, the slide shape 808 has a large flat area 810 with one bend 812 at the edge. These shapes are typical for consumer electronics cover glass applications, where the flat glass covers the display/touch screen area and the bent edges wrap around the device. The results show that the maximum deviation from the ideal shape for the sled shape is +0/−0.034 mm, and that the maximum deviation from the ideal shape for the slide shape is −0.026/+0.031 mm. Both deviations are within the target requirements of +0.050 mm deviation. Moreover, the stress data indicates that the cooling profile and thermal gradient along the thickness of the glass result in very low stress of <1 MPa. Thus, the articles will not need to be further annealed in a separate process step.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for making glass articles, comprising:
   (i) placing a glass sheet on a mold;
   (ii) heating the glass sheet to a first temperature;
   (iii) forming the glass sheet into a glass article having a three-dimensional shape using the mold;
   (iv) providing an isothermal heat transfer device comprising at least one heat pipe in thermal contact with the mold;
   (v) with the glass article on the mold and the isothermal heat transfer device in thermal contact with the mold, transporting the mold, glass article, and the isothermal heat transfer device along a thermally-graded channel to cool the glass article to a second temperature, wherein the isothermal heat transfer device transfers heat from a relatively hot region of the mold to a relatively cold region of the mold during the transporting.

2. The method of claim 1, wherein in the transporting of step (v), heat is transferred from a trailing end of the mold to a leading end of the mold.

3. The method of claim 2, wherein in the transporting of step (v), the thermally-graded channel has a negative thermal gradient in a direction in which the glass article, mold, and isothermal heat transfer device are transported.

4. The method of claim 1, wherein in the transporting of step (v), the transfer of heat by the isothermal heat transfer device is such that a maximum temperature differential across a surface of the glass article does not exceed 5° C.

5. The method of claim 1, wherein in the transporting of step (v), the transfer of heat by the isothermal heat transfer device is such that a maximum temperature differential across a thickness of the glass article is less than 3° C.

6. The method of claim 1, wherein in the transporting of step (v), the transfer of heat by the isothermal heat transfer device is such that after the glass article is separated from the mold, an absolute maximum deviation of a shape of the glass article from an ideal shape is not greater than 0.050 mm.

7. The method of claim 1, further comprising absorbing excess heat from the isothermal heat transfer device using a heat sink.

8. The method of claim 1, further comprising controlling an air temperature in the thermally-graded channel to a temperature of the isothermal heat transfer device during the transporting of step (v).

9. The method of claim 1, wherein in the heating of step (ii), the first temperature is between a temperature corresponding to a glass viscosity of $10^{9.1}$ poise and a temperature corresponding to a glass viscosity of $10^7$ poise.

10. The method of claim 1, wherein in the transporting of step (v), the second temperature is below a temperature corresponding to a glass viscosity of $10^{12}$ poise.

11. The method of claim 1, further comprising preheating the glass sheet to an initial temperature prior to the heating of step (ii).

* * * * *